2,867,661
NON-HYGROSCOPIC ANTIBIOTIC SALT

Jay S. Buckley, Jr., Groton, and Charles R. Stephens, Jr., Waterford, Conn., and Richard L. Wagner, Jr., Forest Hills, N. Y., assignors to Chas. Pfizer & Co., Inc., New York, N. Y., a corporation of Delaware No Drawing. Application December 8, 1955
Serial No. 551,726

1 Claim. (Cl. 260—559)

This invention is concerned with a method for the preparation of a non-hygroscopic salt of the antibiotic, oxytetracycline. In particular, it is concerned with a method for the preparation of a new crystalline modification of oxytetracycline hydrochloride, which possesses certain distinct advantages over hitherto known forms of the antibiotic. This invention is also concerned with a method for crystallizing oxytetracycline hydrochloride in a form that absorbs only a very limited percentage of water when exposed to atmospheres containing high concentrations of moisture.

Oxytetracycline hydrochloride in crystalline form has been prepared previously by crystallization from methanol in the presence of excess hydrochloric acid or calcium chloride or both. This ordinary form of the antibiotic, when exposed to humid atmospheres, tends to absorb moisture to an appreciable extent. Such absorption of moisture has various disadvantages, particularly when it is desired to prepare unit dosage forms of the antibiotic containing a specific measured proportion of the active material. Furthermore, the absorption of moisture may tend to decrease the stability of the compound.

The improved form of oxytetracycline hydrochloride is prepared according to the present invention by heating the antibiotic in certain solvents other than methanol. These solvents are oxygenated, non-reactive organic compounds, liquid at about 5° C. and having at least two carbon atoms and not more than about eight carbon atoms. By "non-reactive" it is meant that under the conditions of crystallization no appreciable destruction of the antibiotic occurs. The solvents are sufficiently polar to dissolve an appreciable amount (at least .2 g./ml.) of the hydrochloride at an elevated temperature, e. g. 50° C. The useful solvents include ethanol, propanol, butanol, acetone, lower aliphatic ethers of ethylene glycol (e. g. the methyl or ethyl ether), benzaldehyde, furfuraldehyde, and mixtures of these solvents.

It is not clear why oxytetracycline hydrochloride, when crystallized from the solvents listed above, has properties which differ appreciably from the oxytetracycline hydrochloride of commerce which is commonly crystallized from methanol. The improved properties of the new crystalline form are not due to a higher purity since substantially pure oxytetracycline crystallized from methanol does not have the desirable improved properties. It is not clear whether an actual change in structure of the compound occurs. However, it has been observed that the X-ray diffraction pattern of the new, non-hygroscopic, crystalline oxytetracycline hydrochloride differs appreciably from that of the hydrochloride crystallized from methanol. The X-ray diffraction patterns were determined with a 57.3 millimeter radius cylindrical powder camera utilizing filtered copper radiation. It was found that the strong $d$ spacings of the novel type of crystalline oxytetracycline hydrochloride differed appreciably from those of the usual commercial form of the antibiotic hydrochloride. Thus, the newer material has strong intensity spacings at 9.2, 5.2, 4.47, 4.05 and 3.29 Angstroms whereas the older commercial material has strong $d$ spacings at 8.4, 7.2, 5.4, 4.2, 4.02, and 3.35 Angstroms. The infrared curves of the two types of antibiotic also differ appreciably. When these are determined with powdered material incorporated in a pellet of potassium bromide, there is a definite shift at certain points in the infrared curve, for instance, such shifts occur in the peak which occurs at approximately 1130 cm.$^{-1}$, which is shifted to a value of approximately 1145 cm.$^{-1}$. The peak at 945 cm.$^{-1}$ is shifted to a value of approximately 950. Furthermore, certain peaks in the infrared change appreciably in their intensity. The peak at 845 cm.$^{-1}$ is appreciably increased in intensity and the peak at approximately 860 cm.$^{-1}$ is appreciably increased in intensity. The compounds are essentially identical in biological activity against various pathogenic microorganisms and each of them is converted to the identical amphoteric oxytetracycline upon neutralization in aqueous solution.

In the operation of the present process, a crude amorphous oxytetracycline hydrochloride having a purity of at least about 80%, or the ordinary commercial crystalline oxytetracycline hydrochloride, that is, the hygroscopic form of the compound, may be utilized as the starting material. This material is placed in the chosen solvent or mixture of solvents, and the mixture is heated. The starting material is thereby converted to the new form of the compound. During the process the solid is partially or completely dissolved with formation of the new crystalline product which separates. If sufficient solvent is used, a clear solution is obtained. If any residual undissolved material remains, this is filtered from the hot solution. In some cases, a small amount of decolorizing carbon is utilized to remove traces of impurities, particularly deeply colored materials.

The solvents suitable for use in practicing the invention vary in their power to dissolve oxytetracycline hydrochloride. In general, it was found that two or more parts of solvent are required per part by weight of the oxytetracycline hydrochloride that is to be crystallized in the novel form. The mixture of oxytetracycline hydrochloride and solvent is stirred and heated, if necessary, to the reflux temperature of the solvent. The optimum temperature may vary somewhat with the particular solvent. In general, the formation of the novel product begins within a few minutes at the chosen elevated temperature. Since the solid tends to crystallize readily from the solvent, it is often desirable if insoluble impurities are to be filtered to use a larger volume of solvent and to remove some of the solvent by distillation after filtration has taken place. Upon concentration, the purified new form of oxytetracycline separates.

After the new form of oxytetracycline hydrochloride has crystallized from the solvent, it is filtered, washed with a small volume of a solvent in which the compound is sparingly soluble, and it is then dried. Acetone is quite useful for washing the crystals and the product may be dried at temperatures up to about 70° C., preferably under vacuum.

In general, yields of at least 85% are obtained in the process of this invention. In many cases, the yield approaches quantitative. In some cases, it has been found advisable to cool the solvent-oxytetracycline hydrochloride mixture after crystallization has occurred. This assures that the maximum yield of the new product is obtained. In addition to the differences noted above, between the novel form of crystalline oxytetracycline hydrochloride and the present commercially available form thereof, it should be noted that these two forms differ in melting point. The new form melts at a temperature of about 204° C., whereas the commercially available hydrochloride melts with decomposition in a range of from 185° C. to 195° C.

As an indication of the advantage of the novel product, it should be noted that the new crystalline form, when exposed for a period of 24 hours to a humidity of 70% in shallow layers in a closed laboratory desiccator absorbed less than 2% of moisture. By way of contrast, the commercially available oxytetracycline hydrochloride crystallized from methanol absorbed 12 to 13% of moisture under identical conditions. Furthermore, the new product lost very little potency at temperatures of 127° C. to 129° C. over a period of 17 hours under which conditions the commercially available form of oxytetracycline hydrochloride crystals lost about 38% of their activity.

The following examples are given by way of illustration and are not to be considered as the sole embodiments of this invention. It is to be understood that protection hereof is only limited by the specific wording of the appended claim.

*Example I*

Twenty grams of oxytetracycline hydrochloride that had previously been crystallized from ethanol was stirred and heated on a steam bath under a reflux condenser with 50 grams of butanol. A temperature of 80° C. was maintained for several minutes. The temperature of the mixture was then gradually lowered. The solid dissolved and then recrystallized from the solvent. After the mixture had been stirred for 30 minutes at room temperature, the crystals were filtered, washed with a small volume of acetone and dried under vacuum at 60° C. A yield of 98% of highly purified, crystalline oxytetracycline hydrochloride was obtained. This product was found to have a microbiological potency of 907 micrograms per milligram, very close to the theoretical value. The product absorbed only 1.17% moisture upon exposure to a relative humidity of 71% for 24 hours. It had a specific rotation of —199°, when dissolved in .01 N-hydrochloric acid at a concentration of 0.4%, and the following analysis:

| | Percent |
|---|---|
| Carbon | 53.08 |
| Hydrogen | 5.03 |
| Chlorine | 7.40 |

The calculated value for $C_{22}H_{25}N_2O_9Cl$ is C, 53.17; H, 5.07; Cl, 7.14. Care must be taken to maintain a fairly elevated temperature when crystallizing oxytetracycline hydrochloride from butanol, since low temperatures will tend to yield a gummy, unfiltrable product. Temperatures as low as 50° C. result in such material.

*Example II*

One kilogram of commercial crystalline oxytetracycline hydrochloride (crystallized from methanol) was suspended in 2500 grams of commercial ethanol. The mixture was heated and stirred at the boiling point of the solvent for a short time. The crystalline compound dissolved and recrystallized. The mixture was gradually cooled to room temperature and stirred at this temperature for 45 minutes. The crystalline oxytetracycline hydrochloride so formed was then filtered, washed with a small volume of acetone, and dried at 60° C. under vacuum. A yield of 98% was obtained. The material had a biological potency of 891 micrograms per milligram. Upon exposure to a relative humidity of 71% for 24 hours, about 2% of moisture was absorbed by the crystalline compound. The product had a specific rotation of —201° at a concentration of 0.4% in 0.01 N-hydrochloric acid.

The experiment was repeated utilizing one kilogram of commercial oxytetracycline hydrochloride and 2500 grams of ethanol. A 95% yield of purified non-hygroscopic crystalline oxytetracycline hydrochloride was obtained. This material assayed 908 micrograms per milligram and absorbed only 0.49% by weight of moisture when exposed for 24 hours to a relative humidity of 71%. The product had a specific rotation of —206°. Analysis:

| | Percent |
|---|---|
| Carbon | 52.95 |
| Hydrogen | 5.12 |

*Example III*

Twenty grams of commercial crystalline oxytetracycline hydrochloride was heated in 50 grams of a mixture of equal volumes of butanol and ethanol. The solid material dissolved and separated again in highly purified crystalline form. The mixture was cooled, and the solid product was filtered, washed with a small volume of acetone and dried under vacuum. The biological activity of the product was 907 micrograms per milligram. It displayed a hygroscopicity corresponding to the absorption of 1.17% of moisture upon exposure at room temperature to a relative humidity of 71% for 24 hours. The specific rotation of the product was —205°.

*Analysis.*—Calcd. for: $C_{22}H_{25}N_2O_9Cl$: C, 53.17; H, 5.07; Cl, 7.14. Found: C, 53.05; H, 5.19; Cl, 7.11.

*Example IV*

Twenty grams of commercial oxytetracycline hydrochloride was suspended in 50 grams of a mixture of equal volumes of acetone and ethanol. The mixture was heated under a reflux condenser to its boiling point. The crystalline solid dissolved and crystallized again. After 20 minutes of stirring, the mixture was cooled gradually to room temperature and stirred in an ice bath at about 5° C. for 30 minutes. The product was filtered, washed with a small volume of acetone, and dried at 60° C. under vacuum. A yield of 87% of non-hygroscopic crystalline oxytetracycline hydrochloride was obtained. This material had a potency of 896 micrograms per milligram. It absorbed only 0.78% of moisture when exposed to a relative humidity of 71% for 24 hours at room temperature. The specific rotation of the product was —205° at a concentration of 0.4% in .01 N-hydrochloric acid.

*Analysis.*—Calcd. for: $C_{22}H_{25}N_2O_9Cl$: C, 53.17; H, 5.07; Cl, 7.14. Found: C, 52.96; H, 5.02.

For comparison a batch of commercial crystalline oxytetracycline hydrochloride was sampled. This material was found to absorb 12.63% moisture when exposed to a relative humidity of 71% for 24 hours under the identical conditions used in testing the compound described above. The commercial product had a specific rotation of —201° in the same solvent and at the same concentration.

*Example V*

Twenty grams of a crude crystalline oxytetracycline was prepared by first precipitating the crude antibiotic by treatment of an oxytetracycline fermentation broth at a basic pH with a long chain alkyl quaternary ammonium chloride. Then the precipitate was treated in methanol with sufficient hydrchloric acid to precipitate crude crystalline antibiotic. The crude crystals were suspended in 50 grams of the monomethyl ether of ethylene glycol (methyl Cellosolve). The mixture was heated to about 75° C. and stirred for one-half hour. The crude material dissolved in the solvent and gradually crystallized. The mixture was slowly cooled to room temperature and then was placed in an ice bath. The mixture was stirred at about 0° to 5° C. for about one-half hour. Then the crystalline product was filtered, washed with a small volume of acetone and dried under vacuum. An 83% yield of a crystalline product having a bio potency of 897 micrograms per milligram was obtained. This material absorbed only 1.14% moisture when exposed for 24 hours to a relative humidity of 71%. The product had an optical rotation of —201° when dissolved in a concentration of 0.4% in 0.1 N-hydrochloric acid.

Example VI

Twenty grams of the same crude crystalline oxytetracycline hydrochloride used in the previous example was suspended in 50 grams of the monoethyl ether of ethylene glycol (ethyl Cellosolve). The mixture was stirred and heated to about 70° C. The crystalline product gradually dissolved and then gradually recrystallized. The mixture was cooled slowly to room temperature over a period of about one hour, and it was then stirred in an ice bath for about 30 minutes. The recrystallized product was filtered, washed with a small volume of acetone and dried. The product thus obtained had a bio potency of 893 micrograms per milligram and absorbed only 1.43% moisture under the conditions described in the previous example.

Example VII

Twenty grams of crude crystalline oxytetracycline hydrochloride was dissolved in 50 grams of a mixture of equal volumes of monoethyl ether of ethylene glycol and isopropanol. The mixture was heated until a clear solution was obtained and the purified product began to crystallize. The mixture was thereupon gradually cooled to room temperature for a period of one hour and then stirred at about 5° C. for one-half hour. The crystalline product was filtered, washed with a small volume of ethanol and dried under vacuum at about 50° C. This product had a biological assay of 845 micrograms per milligram and absorbed only 1.36% moisture upon exposure to a relative humidity of 71% at a temperature of 25° C. for a period of 24 hours. The product had an optical rotation of $-194°$ at a concentration of 0.4% in .01 N-hydrochloric acid.

Example VIII

The above procedure was repeated utilizing a solvent mixture of monoethyl ether of ethylene glycol and butanol. Substantially the same result was obtained.

Example IX

Twenty grams of crystalline oxytetracycline hydrochloride that had been obtained by crystallization from methanol was heated in 50 grams of furfuraldehyde. The product gradually dissolved and then recrystallized. The mixture was then slowly cooled to room temperature. After stirring at 30° C. in an ice bath, the product was filtered, washed with a small volume of ethanol and dried at 50° C. under vacuum. The product that was isolated was found to be substantially non-hygroscopic when exposed to high humidities for extended periods of time.

Example X

Fifty grams of oxytetracycline hydrochloride of commerce was heated in 150 grams of benzaldehyde. The mixture was maintained at a temperature of 70° C. for approximately one-half hour. The crystals dissolved and separated again. The mixture was cooled gradually to room temperature over a period of one hour and then stirred in an ice bath for approximately one-half hour. The product was filtered, washed with a small volume of acetone and dried at 60° C. under vacuum. The dried product was found to be of very low hygroscopicity absorbing only about 1% of moisture upon exposure to 71% relative humidity for 24 hours at room temperature.

The new crystalline product of this invention may be described as oxytetracycline hydrochloride having a melting point of about 204° C., a very limited hygroscopicity, and an appreciably higher stability to heat than has the ordinary oxytetracycline hydrochloride of commerce. These characteristics definitely distinguish it from the ordinary form of the antibiotic hydrochloride. Furthermore, as noted above, the present product differs in its infrared absorption spectrum and X-ray diffraction pattern from those of the ordinary crystalline oxytetracycline hydrochloride of commerce, which is crystallized from methanol.

What is claimed is:

A process for the preparation of relatively non-hygroscopic, crystalline oxytetracycline hydrochloride having a melting point of about 204° C. which comprises heating about one part by weight of oxytetracycline hydrochloride having a melting point of from about 185° C. to 195° C. in at least two parts by weight of a solvent selected from the group consisting of acetone, benzaldehyde, furfuraldehyde, two to four carbon atom alkanols, lower alkyl ethers of ethylene glycol and mixtures thereof at a temperature of at least about 50° C. and up to the reflux temperature of the selected solvent and recovering resulting crystalline oxytetracycline hydrochloride having a melting point of about 204° C.

References Cited in the file of this patent

UNITED STATES PATENTS

| | | |
|---|---|---|
| 2,516,080 | Sobin et al. | July 18, 1950 |
| 2,699,054 | Conover | Jan. 11, 1955 |
| 2,734,018 | Minieri et al. | Feb. 7, 1956 |

FOREIGN PATENTS

| | | |
|---|---|---|
| 525,518 | Belgium | Jan. 30, 1954 |
| 713,411 | Great Britain | Aug. 11, 1954 |
| 718,027 | Great Britain | Nov. 10, 1954 |

OTHER REFERENCES

Reeves: Chem. Eng., vol. 59, No. 1, January 1952, page 146.

Finlay: "Science," vol. 111, January 25, 1950, page 85.

Regna et al.: "Ann. N. Y. Acad. Sci.," vol. 53, No. 2, September 15, 1950, pages 229 to 237.

Hochstein et al.: J. Am. Chem. Soc., vol. 75, November 28, 1953, pages 5467 and 5470.

Gailliot et al.: "Comptes Rend., 27° Cong. Intern. Chim. Ind." (Brussels), 11–20, September 1954, vol. 3, pages 506 to 508.

UNITED STATES PATENT OFFICE

CERTIFICATE OF CORRECTION

Patent No. 2,867,661                                January 6, 1959

Jay S. Buckley, Jr., et al.

It is hereby certified that error appears in the printed specification of the above numbered patent requiring correction and that the said Letters Patent should read as corrected below.

Column 3, line 24, for "ethanol" read -- methanol --.

Signed and sealed this 5th day of May 1959.

(SEAL)

Attest:

KARL H. AXLINE                                              ROBERT C. WATSON

Attesting Officer                                         Commissioner of Patents